United States Patent
Kisaki et al.

[15] 3,694,465
[45] Sept. 26, 1972

[54] METHOD FOR CONCENTRATION OF AQUEOUS TETRAHYDROFURAN SOLUTIONS BY EXTRACTION WITH AQUEOUS ALKALI METAL HYDROXIDE

[72] Inventors: Hisashi Kisaki; Shunsuke Mabuchi; Toshikatsu Mizuno, all of Yamaguchi, Japan

[73] Assignee: Toyo Soda Manufacturing Co., Ltd., Tsuno-gun, Yamaguchi-ken, Japan

[22] Filed: Aug. 11, 1970

[21] Appl. No.: 63,024

[30] Foreign Application Priority Data

Aug. 14, 1969 Japan ...................44/63840

[52] U.S. Cl. .................260/346.1, 203/14, 203/37, 203/43
[51] Int. Cl. ..........................................C08d 5/02
[58] Field of Search ....203/14, 37, 43, 53; 260/346.1

[56] References Cited

UNITED STATES PATENTS

| | | | |
|---|---|---|---|
| 2,251,835 | 8/1941 | Reppe et al | 260/346.1 |
| 2,366,464 | 1/1945 | Wilson | 260/346.1 |
| 3,138,545 | 6/1964 | Reed et al | 203/14 |
| 1,466,435 | 8/1923 | Hammond | 203/37 |
| 2,251,895 | 8/1941 | Reppe et al | 260/346.1 |
| 2,779,721 | 1/1957 | Houtman, Jr. et al | 203/37 |
| 2,795,591 | 6/1957 | Bente, Jr. | 260/346.1 |

*Primary Examiner*—Wilbur L. Bascomb, Jr.
*Attorney*—Flynn & Frishauf

[57] ABSTRACT

A method for producing anhydrous tetrahydrofuran from an aqueous solution of tetrahydrofuran which comprises contacting an aqueous solution of an alkali metal hydroxide with the aqueous solution of tetrahydrofuran to remove the water.

6 Claims, 1 Drawing Figure

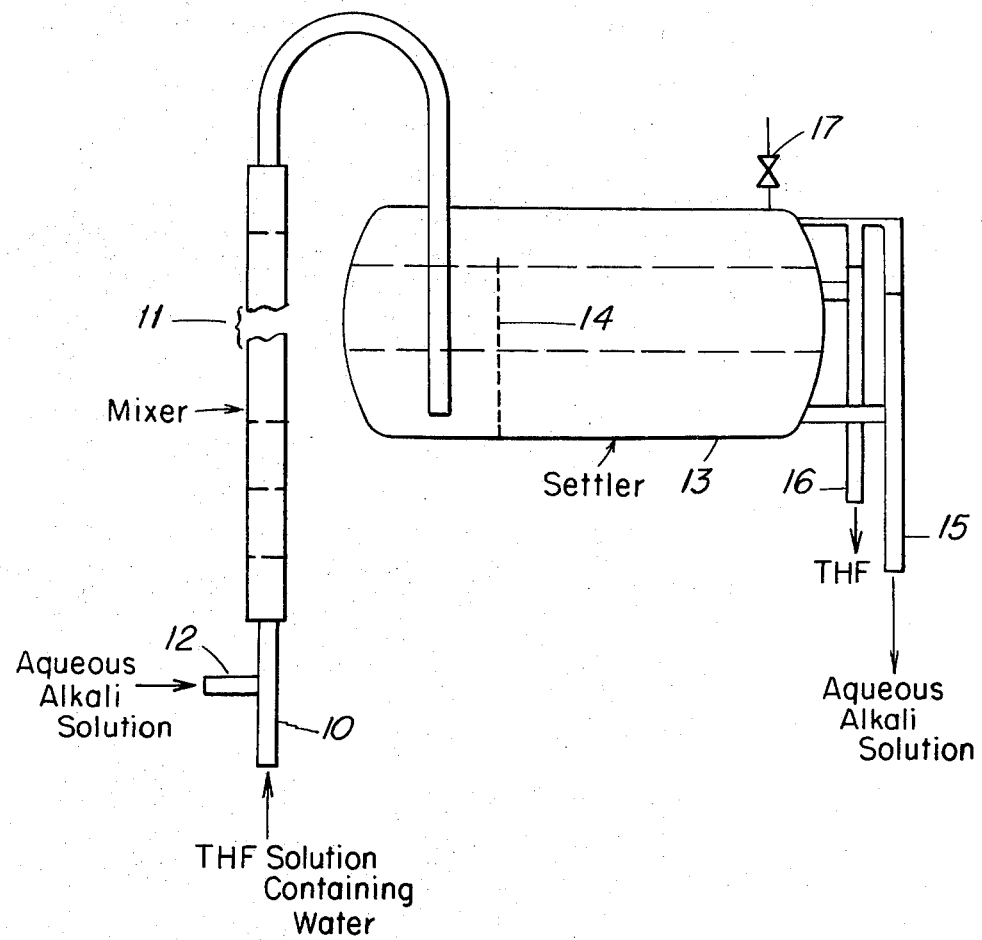

METHOD FOR CONCENTRATION OF AQUEOUS TETRAHYDROFURAN SOLUTIONS BY EXTRACTION WITH AQUEOUS ALKALI METAL HYDROXIDE

This invention relates to a method of concentrating aqueous solutions of tetrahydrofuran.

The following methods are known for the separation of tetrahydrofuran from an aqueous solution of tetrahydrofuran.

1. Addition of a solid dehydrating agent such as, for example, potassium hydroxide, sodium hydroxide, potassium carbonate or sodium carbonate, and subsequent distillation to recover the tetrahydrofuran.
2. Addition of, for example, glycerin, toluene, xylene or n-heptane to an aqueous solution of tetrahydrofuran, followed by stirring and subsequent settling. The upper tetrahydrofuran layer obtained by this phasic separation is distilled to recover the tetrahydrofuran.
3. Heating of an aqueous solution of tetrahydrofuran with the addition of an entrainer of water such as carbon disulfide or ether to recover the tetrahydrofuran.
4. Distillation of an aqueous solution of tetrahydrofuran with a solvent such as, for example, butanediol, glycerin or ethylene glycol to recover the tetrahydrofuran.
5. Removal of water from an aqueous solution of tetrahydrofuran by extraction with a saturated aqueous solution of, for example, calcium chloride or magnesium chloride to recover the tetrahydrofuran.

However, those conventional methods have their characteristic disadvantages which include unsatisfactory degrees of dehydration that can be obtained or the complexity of the process attending to the recovery of the reagent used and of tetrahydrofuran from the reagent.

In the light of the fact that a mixture of tetrahydrofuran and water may be easily separated by simple distillation into water and an azeotropic mixture, the fundamental principle of recovering a high purity tetrahydrofuran is the separation of water from such an azeotropic mixture to obtain a solution of tetrahydrofuran which is more concentrated than the azeotropic composition. As a result of our studies on the liquid-liquid equilibrium composition of tetrahydrofuran, water and a third reagent and on water extraction velocities, we have found that a quite improved result is obtained with the use of an aqueous solution of alkali metal hydroxide than by using the compound in the form of a solid.

Thus, such an alkali metal hydroxide is substantially insoluble in tetrahydrofuran, while tetrahydrofuran is slightly soluble in an aqueous phase containing 20 percent or more of an alkali metal hydroxide only to a concentration which may be disregarded in the recovery of tetrahydrofuran. Furthermore, the residual water content of the tetrahydrofuran phase may be easily reduced to a value of 0.5 weight percent or less which is far lower than the corresponding content of the azeotropic mixture at atmospheric pressure. (about 6 weight percent)

In other words, an aqueous solution of 30 percent or more alkali of metal hydroxide concentration is almost comparable to the corresponding solid alkali so far as dehydration power in concerned.

In addition, when a solid alkali is employed, a considerable amount of tetrahydrofuran may be lost in the form of emulsion with discharged liquid alkali.

Therefore, it is difficult to hold the loss to 1 percent of even when the settling time is 5 to 8 hours, the duration is commercially allowable.

When an alkali is used in liquid form, it is easy to restrict the loss to less than 0.1 percent during a settling time of 3 hours at the maximum.

What is noteworthy is that the lower the concentration of alkali, the shorter the time of reaching liquid-liquid equilibrium. Furthermore, the advantage of the present invention which utilizes a liquid alkali over the conventional art involving the use of a solid alkali is at once apparent when one refers to the relative ease of transportation of a liquid against the packing and charging of a solid material.

Furthermore, when a given amount of a dehydrating agent is permitted to act upon an aqueous solution of tetrahydrofuran for a given time, it is clear that the use of a liquid reagent is more advantageous than the use of a solid reagent in terms of contact area, state of dispersion, ease of contact and other aspects.

Stated differently, to achieve a given degree of dehydration, the amount of the extractant required is smaller when it is a liquid.

In the extraction of water with an aqueous solution of a salt such as, for example, calcium chloride, magnesium chloride or potassium carbonate, it is impossible to reduce the water content of the tetrahydrofuran layer to less than 1.5 percent even with the use of a saturated solution. The increase in residual water content is an economical disadvantage, for it represents an increased volume of circulation through an azeotropic dehydration still.

In accordance with one embodiment of this invention, it is convenient to employ an extractor in conjunction with a settling vessel, and the flows of aqueous tetrahydrofuran and the aqueous alkali solution may be either parallel or countercurrent.

An example will be shown in which a 48 percent aqueous solution of sodium hydroxide is used for the recovery of a mixture of 99.5 percent tetrahydrofuran and 0.5 percent water on the basis of the ternary equilibrium.

In this example, it is sufficient to employ a one-stage extractor when the expected alkali concentration of the exit solution is 40 percent or higher, a two-stage extractor when the exit alkali concentration is 30 percent and a four-stage extractor when the concentration is 20 percent. The concentration of alkali metal hydroxide in the tetrahydrofuran phase is less than 0.1 ppm, and the concentration of tetrahydrofuran in the aqueous alkali solution phase is 0.6 to 0.7 percent (alkali concentration of exit solution is 20 percent), 0.08 to 0.1 percent (30 percent) or 0.01 to 0.02 percent (40 percent).

The upper limit of alkali concentration is about 50 to 60 percent under atmospheric pressure and ordinary temperature. However, at an elevated pressure and elevated temperature, the alkali concentration may be higher, though the use of pressure vessels would be insensible, costwise.

Of the two liquid phases obtained on standing after a sufficient contacting time, the tetrahydrofuran layer is fed into a distillation column or still for complete dehydration, wherein an azeotropic mixture of water and tetrahydrofuran is obtained at the top of the column and anhydrous tetrahydrofuran at the bottom. The aqueous alkali layer may, if required, be transferred to a tetrahydrofuran recovery step and, if necessary, to a concentration means, but the recovery of tetrahydrofuran from this phase is generally unnecessary if a suitable exit concentration is selected.

The following examples are further illustrative of this invention.

EXAMPLE 1

A glass extractor equipped with a stirrer was continuously fed with varying proportions of tetrahydrofuran containing 6 percent water and of a 48 percent aqueous solution of sodium hydroxide. The two materials were vigorously stirred. The mixture was then allowed to separate into two layers in a settling vessel. The average residence time of the sodium hydroxide in the settling vessel was 180 minutes.

The results are summarized below.

| | | | | |
|---|---|---|---|---|
| THF (6% water)(parts) | 100 | 100 | 100 | 100 |
| 48% sodium hydroxide(inch) | 50 | 17 | 10 | 6 |
| Water content of THF (%) | 0.35 | 0.54 | 0.83 | 1.4 |
| Loss of THF (%) | 0.015 | 0.005 | 0.001 | 0.01 |

EXAMPLE 2

A glass extractor equipped with a stirrer was continuously fed with varying proportions of tetrahydrofuran containing 6 percent water and a 35 percent aqueous solution of sodium hydroxide. After the materials were vigorously stirred, the mixture was separated into two layers in a settling vessel.

The average residence time of the sodium hydroxide in the settling vessel was 180 minutes. The conditions and results are as set forth below.

| | | | |
|---|---|---|---|
| THF (6% water)(parts) | 100 | 100 | 100 |
| 35% sodium hydroxide(inch) | 100 | 50 | 15 |
| Water content of THF (%) | 0.9 | 1.3 | 2.4 |
| Loss of THF (%) | 0.03 | 0.005 | 0.02 |

EXAMPLE 3

A glass extractor equipped with a stirrer was continuously supplied with 100 parts tetrahydrofuran containing 70 percent water and 50 parts of 48 percent aqueous solution of sodium hydroxide. After thorough mixing, the mixture was allowed to separate into two layers in a settling vessel.

The average residence time of the sodium hydroxide in the settling vessel was 60 minutes. The water content of the product tetrahydrofuran was 4.7 percent and the sodium hydroxide content of the same was not sufficient to be positive to phenolphthalein. The concentration of sodium hydroxide in the exit solution was 20.1 percent and the tetrahydrofuran content thereof was 0.6 percent.

The percent recovery of tetrahydrofuran was 97.7 percent.

EXAMPLE 4

One-hundred parts tetrahydrofuran containing 6 percent water and 40 parts of 51.6 percent aqueous solution of potassium hydroxide were continuously fed to a glass extractor equipped with a stirrer and after thorough mixing, the mixture was allowed to separate into two layers in a settling vessel. The average residence time of the potassium hydroxide in the settling vessel was 180 minutes. The water content of the tetrahydrofuran layer was 0.4 percent, and the potassium hydroxide content of the same layer was not sufficient to be positive to phenolphthalein.

The potassium hydroxide concentration of the exit solution was 45 percent and the tetrahydrofuran content of the same solution was 0.4 percent.

The percent recovery of tetrahydrofuran was 99.8 percent.

The invention can be carried out in typical apparatus as shown in the drawing. Aqueous THF is charged through line 10 to mixing vessel 11 with an aqueous alkali hydroxide solution charged through line 12. Vessel 11 is equipped with an agitator (not shown). The resulting mixture formed in vessel 11 is discharged into settler 13, which is preferably equipped with baffle 14. Aqueous alkali solution is withdrawn from settler 13 through line 15, and THF containing substantially less water than in line 10 is discharged from 13 through line 16. Vessel 11 can be equipped with valved vent line 17.

We claim:

1. A method for removing water from aqueous solution (1) hydroxide tetrahydrofuran, which comprises contacting an aqueous solution (2) of an alkali metal hydroxide with said aqueous solution (1) of tetrahydrofuran, whereupon water is extracted from solution (1) by solution (2), and recovering tetrahydrofuran (3) having a substantially lower water content than said solution (1), the alkali metal hydroxide concentration of said aqueous alkali metal hydroxide solution being from 30 to 60 weight percent.

2. A method according to claim 1, wherein said alkali metal hydroxide is selected from the group consisting of sodium hydroxide and potassium hydroxide.

3. A method according to claim 1, wherein the concentration of said alkali metal hydroxide in the resulting residual phase after recovery of the tetrahydrofuran water mixture is more than 20 percent.

4. A method according to claim 1, wherein said tetrahydrofuran (3) is distilled in a distillation vessel, an azeotropic mixture of water and tetrahydrofuran is removed as an overhead fraction from said vessel, and substantially anhydrous tetrahydrofuran is removed as bottoms fraction from said vessel.

5. A method according to claim 4, wherein said alkali metal hydroxide is selected from the group consisting of sodium hydroxide and potassium hydroxide.

6. A method according to claim 4, wherein the concentration of said alkali metal hydroxide in the resulting residual phase after recovery of the tetrahydrofuran water mixture is more than 20 percent.

* * * * *